(12) United States Patent
Farnell, Jr.

(10) Patent No.: US 7,598,444 B2
(45) Date of Patent: Oct. 6, 2009

(54) MOLDED STRINGED INSTRUMENT BODY WITH WOODEN CORE

(76) Inventor: Alfred D. Farnell, Jr., 180 N. 10th Ave., Upland, CA (US) 91786

( * ) Notice: Subject to any disclaimer, the term of this patent is extended or adjusted under 35 U.S.C. 154(b) by 147 days.

(21) Appl. No.: 12/016,194

(22) Filed: Jan. 17, 2008

(65) Prior Publication Data

US 2009/0013848 A1    Jan. 15, 2009

Related U.S. Application Data (63) Continuation-in-part of application No. 11/827,008, filed on Jul. 10, 2007, now abandoned.

(51) Int. Cl.
*G10D 3/00* (2006.01)
(52) U.S. Cl. ....................................... 84/291
(58) Field of Classification Search ............ 84/267, 84/290, 291
See application file for complete search history.

(56) References Cited

U.S. PATENT DOCUMENTS

| | | | |
|---|---|---|---|
| 3,427,915 A | 2/1969 | Mooney | |
| 3,618,442 A | 11/1971 | Kawakami | |
| 3,664,911 A | 5/1972 | Takabayashi | |
| 4,185,534 A | 1/1980 | Cove | |
| 4,188,850 A | 2/1980 | Kaman, II | |
| 4,213,370 A | 7/1980 | Jones | |
| 4,290,336 A | 9/1981 | Peavey | |
| 4,313,362 A | 2/1982 | Lieber | |
| 4,334,452 A | 6/1982 | Morrison, III | |
| 5,054,356 A | 10/1991 | Farnell, Jr. | |
| 5,469,770 A | 11/1995 | Taylor | |
| 6,107,552 A | 8/2000 | Coomar | |
| 6,359,208 B1 | 3/2002 | Farnell, Jr. | |
| 6,538,183 B2 | 3/2003 | Verd | |
| 6,683,236 B2 * | 1/2004 | Davis et al. | 84/291 |
| 6,686,522 B2 | 2/2004 | Won | |
| 6,933,428 B1 | 8/2005 | Pedgley | |
| 7,141,730 B1 | 11/2006 | Wu | |

* cited by examiner

*Primary Examiner*—Kimberly R Lockett
(74) *Attorney, Agent, or Firm*—Donald W. Meeker (57) ABSTRACT

A stringed musical instrument body is formed using injection molded high density polystyrene foam with a foaming agent. It is injection molded by itself or around a wooden core to make the body or to form two panels adhered together to sandwich a wooden core therebetween. The core provides good wood tone and the polystyrene with a foaming agent produces good sustain and a resonance of about twenty-eight seconds. A metal reinforced injection molded neck resists warping.

22 Claims, 8 Drawing Sheets

MOLDED STRINGED INSTRUMENT BODY WITH WOODEN CORE

CROSS-REFERENCE TO RELATED APPLICATIONS

The present utility patent application is a continuation-in-part of applicant's prior patent application Ser. No. 11/827,008, filed Jul. 10, 2007.

STATEMENT REGARDING FEDERALLY SPONSORED RESEARCH OR DEVELOPMENT

Not Applicable.

THE NAMES OF THE PARTIES TO A JOINT RESEARCH OR DEVELOPMENT

Not Applicable.

BACKGROUND OF THE INVENTION

1. Field of the Invention

The present invention relates to stringed instruments and particularly to a stringed instrument having a body made of injection molded high density polystyrene foam with a foaming agent which is injection molded to be used by itself or injected around a wooden core, the wooden core having alignment holes for receiving pins on the mold thereby holding the core in place during the injection molding process or injected to form a top and bottom panel adhered together with a wooden core sandwiched therebetween, and to injection mold a metal reinforced neck.

2. Description of Related Art including information disclosed under 37 CFR 1.97 and 1.98

Desirable characteristics for stringed instruments, such as base viols, cellos, guitars, and violins, etc., include the provision of sharp, clear tones, and substantial resonance. Prior art guitars often do not produce such tones, and typically have resonance periods of only about 8 seconds.

U.S. Pat. No. 7,141,730, issued Nov. 28, 2006 to Wu, is for a method of producing electric guitar body without the costly and time-consuming process of wood-carving or other traditional woodworking technique. By creating the molds and injecting proper materials, present invention also achieves the 3-D artistic rendition of desired shape for an electric guitar body and at reduced weight than solid wood carving guitar body. Reinforcement wood pieces are added into the two respective molds, to provide structural strength.

U.S. Pat. No. 4,334,452, issued Jun. 15, 1982 to Morrison, III, illustrates a plastic body for a solid body musical instrument such as an electric guitar, which body consists of a plastic body molded in the shape of the musical instrument body and a structural support member of wood or other suitable material embedded within the plastic body. The structural support member has a profile shape which is substantially a reduced scale version of the profile shape of the body and is so dimensioned and positioned within the body that the thickness of plastic about the structural member at most points along the member is substantially minimized and the mass of plastic material on one side of the member is not substantially greater than the mass of plastic on the opposite side of the member. The body is adapted to have an electric pickup mounted thereon, the support member being exposed in the area thereof adjacent the pickup and the pickup being mounted in close proximity to the exposed portion of the member.

U.S. Pat. No. 6,359,208, issued Mar. 19, 2002 to Farnell, Jr., discloses a stringed musical instrument or guitar having a plastic foam body substantially covered by a shell of thermoplastic material, a wood base on the plastic foam body, a plurality of strings supported to extend above the wood base, and at least one electromagnetic pick-up at the base. Musical vibrations produced by strumming the strings are conducted via the plastic foam body and wood base are largely sensed by the electromagnetic pick-up.

U.S. Pat. No. 5,054,356, issued Oct. 8, 1991 to Farnell, Jr., indicates a guitar which has a hollow plastic body including spaced front and back panels, and a foam plastic core disposed between the panels, whereby upon vibration of the panels air trapped within the individual cells of the foam core are alternately pressurized and depressurized, thus to enhance the musical output of the guitar.

U.S. Pat. No. 6,686,522, issued Feb. 3, 2004 to Won, provides a musical instrument with a body made of polyurethane foam. Won relates a musical instrument having its entire body portion manufactured by molding the body with synthetic resin, in which said musical instrument is an electric guitar that has the entire body consisting of a base plate, a neck part connected to the base plate and a head part connected to the end of the said neck part to hang the strings, and in which the said entire body is made of polyurethane foam having specific gravity in the range of 0.3 to 0.9. In the polyurethane foam additional porous particles sizing average diameter from 1 to 50 .mu.m selected from a group comprising wood chips, silica or mixtures thereof may homogeneously be contained in an amount of 5 to 8% by weight. Furthermore, a piano, an exterior casing of amplifier and/or an exterior casing of electric guitar may also be made of polyurethane foam having specific gravity in the range of 0.3 to 0.9.

U.S. Pat. No. 6,683,236, issued Jan. 27, 2004 to Davis, shows a one piece composite guitar body. A body for a stringed instrument is provided comprising a front face and a back face and a continuous side face there around; and an exterior laminate, the exterior laminate being formed of a plurality of composite layers including an interior layer, the composite layers of the laminate also including at least one supplemental layer, each layer including strands enveloped in an associated polymeric binder, with each subsequent layer being in intimate contact with the next adjacent layer. Davis also mentions that if a solid body is desired such as used with electric guitars, the appropriate shape needs to be molded. Foam can then be injected into the cavity of the hollow shell and the part may be removed from the mold and finished using conventional methods.

U.S. Pat. No. 6,538,183, issued Mar. 25, 2003 to Verd, claims methods of construction for acoustic and electrically amplified stringed musical instruments. The invention further relates to acoustic and electrically amplified stringed musical instruments comprising fiber-reinforced resin composite materials, where the instruments are provided with a sound-damping interior coating. In another variation of the method of the invention, after the mold pieces are mated, a fast-curing foam is blown into the space between the top layers and bottom layers of resin-impregnated fiber cloth, to press them firmly against the mold surfaces. The foam-filled mold is then held at a curing temperature for a time sufficient to cure the fiber-reinforced composite material. After the curing is complete, some or all of the foam can be removed, as desired for optimal sound production. If the instrument is to be electrically amplified, it may be desirable to leave much of the polymerized foam intact.

U.S. Pat. No. 4,213,370, issued Jul. 22, 1980 to Jones, describes molded plastic guitars having a soundbox body which is a one piece plastic molding having an offset bottom concave-convex substantially parabolic sound reflector area joined by a reinforcing rib structure to the wall of the body. A top panel is mounted on a supporting and reinforcing frame attached to the upper edges of the body wall. A neck molded from lightweight plastic has lightweight metal reinforcement extending longitudinally therein. An attachment heel structure on the neck is received and secured in a complementary socket in the upper bout of the soundbox body. Tuning gear is housed in complementary bearing recesses formed complementally in a head panel on the neck and a head plate removably secured to the head panel, and providing bearing holes through which tuning posts extend for attachment of the tuning ends of the playing strings which extend therefrom over an adjustable nut and spaced over the finger board, and then across a sound hole bordered by a ring member locating a pick guard. Anchorage for the strings is provided by a bridge structure comprising a base member on which is mounted a pad carrying a saddle, the pad having means securing the bridge assembly in place on the top panel. Attached to the lower face of the top panel is a bracing structure comprising bars and ribs in a one piece molding together with the supporting and reinforcing frame and including an attachment pad underlying the bridge structure to which the bridge pad is attached.

U.S. Pat. No. 3,427,915, issued Feb. 18, 1969 to Mooney, puts forth an acoustic panel, particularly the front and back panels of a violin, which has three-ply sandwich construction with a strip of balsa or a rigid foam that can serve as a center ply between rigidifying outer plies. Mooney mentions the use of polystyrene foam.

U.S. Pat. No. 5,469,770, issued Nov. 28, 1995 to Taylor, concerns a distributed load soundboard apparatus for a stringed musical instrument which can be constructed of traditional tonewoods or from manmade materials such as carbon graphite, expanded polystyrene plastic rigid foam or other molded plastics, polyurethane or epoxy material compounds (mineral loaded or not) or even lightweight metals.

U.S. Pat. No. 6,933,428, issued Aug. 23, 2005 to Pedgley, is for acoustic devices, particularly musical instruments, having a soundboard formed from expanded polycarbonate having a foamed structure, methods of manufacture of same, and the use of specific soundboards in the manufacture of acoustic devices.

U.S. Pat. No. 4,290,336, issued Sep. 22, 1981 to Peavey, provides a guitar neck and body made from moldable materials such that the finished guitar may be made either solid, semi-solid, or substantially hollow, and wherein the structure further includes interconnection areas between the various components to provide a finished article which can be durable, require less manufacturing processes, while simultaneously providing performance characteristics at least comparable to conventional designs for guitars.

U.S. Pat. No. 4,185,534, issued Jan. 29, 1980 to Cove, shows the use of a foamed polymeric material in the fabrication of solid-bodied, stringed musical instruments with the preferred material being a homogeneous body of foamed polystyrene having a density of from about 0.5 to about 6 pounds per cubic feet. Since the neck assembly must of necessity have greater structural strength than the body, it is contemplated using a relatively simple disconnect mechanism for coupling same to the body. Although the essence of the invention lies in the fact that with the foamed solid body additional sounding amplification means are unnecessary, electrical amplification can optionally be added to said instruments.

U.S. Pat. No. 3,618,442, issued Nov. 9, 1971 to Kawakami, claims foamed materials of various synthetic resins for making vibrating plates of sound instruments, such as, piano or guitar. Such resins include polystyrene, polyvinylchloride and the like.

U.S. Pat. No. 4,313,362, issued Feb. 2, 1982 to Lieber, describes guitar construction. A body is provided having a rear panel and sides integrally formed of plastic, with a top panel secured across the upper sides, the body being connected to a neck, having a U-shaped cross section, and a peghead, integrally formed of plastic with the neck. A flat plastic panel is secured across the open side of the neck, for attachment of a fret board, and a reinforcement rod runs from the butt end of the body to the upper portions of the peghead. Plastic foam is shot within all interior portions of the body, neck and peghead.

U.S. Pat. No. 6,107,552, issued Aug. 22, 2000 to Coomar, discloses a stringed instrument soundboard including composite structure that includes first and second opposed layers of a stiffened graphite sheet material and a low-density foam core interposed between the first and second opposed layers.

U.S. Pat. No. 3,664,911, issued May 23, 1972 to Takabayashi, puts forth a diaphragm for sound instrument and method for producing same in which the diaphragm comprises an assembly of foamed granules of thermoplastic resin, binder layer surrounding the foamed granules and connecting them together to form an integral body of the diaphragm and a fibrous reinforcing material applied on at least one surface of said body and embedded in the binder to form a reinforcing layer. The diaphragm may be used as a sounding board of a guitar or a piano.

U.S. Pat. No. 4,188,850, issued Feb. 19, 1980 to Kaman, II, concerns a foamed plastic guitar construction. The guitar has a separate body and neck each made of a metallic frame combined with a mass of structural foamed plastic. A solid joint, involving metal to metal contact of the two frames, is provided between the body and the neck and is readily unmade to allow disassembly of the neck from the body for repair or replacement of either the body or the neck. The two frames provide a continuous metallic span from the nut to the bridge to inhibit bending under string tension and also to enhance sustain by reducing damping. The external surface of the neck and body plastic masses may be given a grain effect, color and finish causing such masses to closely simulate wood.

What is needed is a stringed musical instrument which produces superior tone, sustain and resonance and yet can be mass produced quickly and inexpensively.

BRIEF SUMMARY OF THE INVENTION

An object of the present invention is to provide a stringed musical instrument and a method for making a stringed musical instrument by injection molding high impact polystyrene having a foaming agent injection molded around the wooden core which produces superior tone, sustain and resonance and yet can be mass produced quickly and inexpensively.

An alternate object of the present invention is to provide a stringed musical instrument and a method for making a stringed musical instrument by injection molding high impact polystyrene having a foaming agent to form a top panel and a bottom panel which are adhered together to sandwich the wooden core which produces superior tone, sustain and resonance and yet can be mass produced quickly and inexpensively.

Another object of the present invention is to form a neck for a stringed musical instrument by injection molding a synthetic material to form an elongated rigid neck shaped element with a groove down the center of a front side to receive a meta bar therein to prevent warping of the neck with the fingerboard adhered over the groove.

In brief, the present invention provides a stringed musical instrument formed using injection molded high impact polystyrene foam with a foaming agent injection molded around a wooden core, used by itself, or molded into a top and bottom panel adhered together to sandwich a wooden core therebetween. The wooden core used in the mold has alignment holes for receiving pins from the mold thereby holding the core in place during the injection molding process. The core provides good wood tone and the polystyrene with a foaming agent produces good sustain and a resonance of about 28 seconds. The high impact polystyrene is sufficiently strong to make a body portion of a stringed instrument to insure a durable stringed musical instrument body without the need for an inner wooden insert 12 which could be used to obtain a desirable wood tone in the stringed musical instrument. While the examples shown in the drawings display a guitar, it could be any stringed musical instrument employing the exact same description ad method.

An advantage of the present invention is that provides a method for making a stringed musical instrument that makes it easy to create an excellent sounding stringed musical instrument body quickly and inexpensively.

Another advantage of the present invention is that it provides a stringed musical instrument which has great wood tone and superior sustain and resonance.

A further advantage of the present invention is that it provides an inexpensively fabricated neck which will not warp.

BRIEF DESCRIPTION OF THE SEVERAL VIEWS OF THE DRAWINGS

These and other details of my invention will be described in connection with the accompanying drawings, which are furnished only by way of illustration and not in limitation of the invention, and in which drawings.

DETAILED DESCRIPTION OF THE INVENTION

In FIGS. 1-12B, a stringed musical instrument 20 and 20A comprises a body portion 10, 10A and 10B formed of an injection molded high impact polystyrene with a foaming agent 14 and 14A and 14B which may have a wooden inner core 12.

Figure 1:
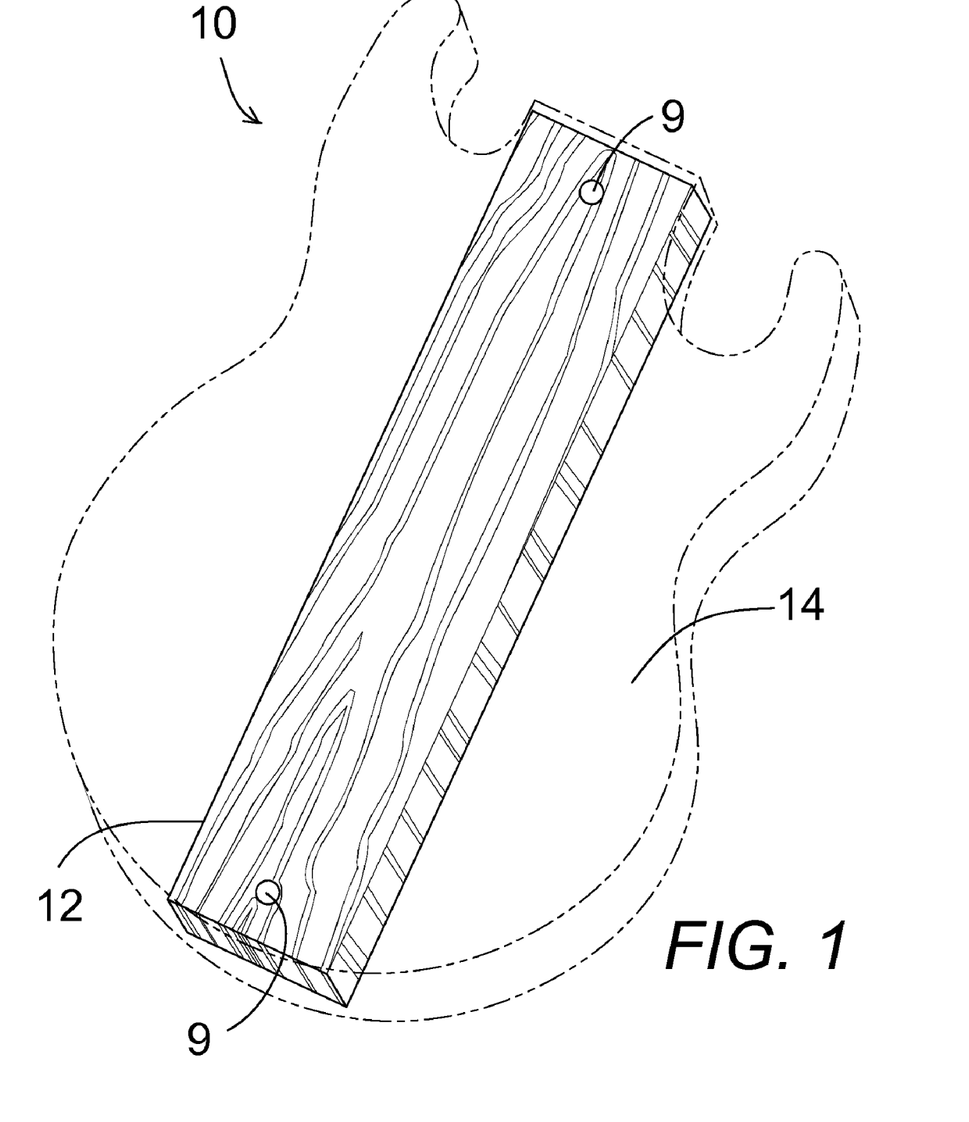
FIG. 1 is a perspective view of the stringed musical instrument (guitar) body of the present invention showing the wooden inner core with the shaped body portion shown dashed.
Figure 2:
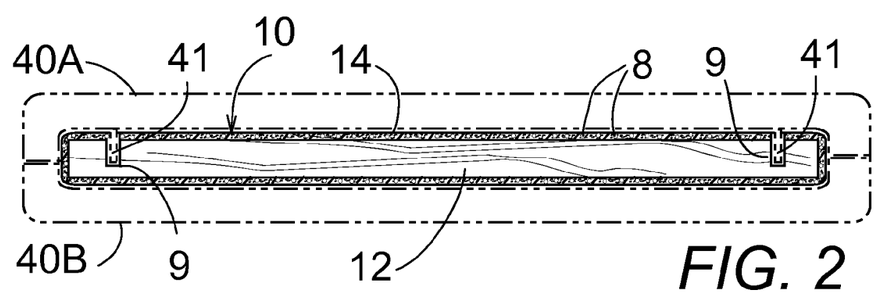
FIG. 2 is a cross-sectional view taken transversely through the stringed musical instrument (guitar) body of FIG. 1 showing the stringed musical instrument body in the injection mold with the pins from one side of the mold in the mating holes in the wooden inner core.

In FIGS. 1-4, a stringed musical instrument 20 comprises a stringed musical instrument body 10 comprising a wooden inner core 12 having a pair of spaced cylindrical holes 9 comprising a means for receiving two pins 41 comprising a holding device from a two-part injection mold 40A and 40B, as shown in FIG. 2, to secure the wooden inner core within the injection mold cavity during an injection molding process, and a shaped body portion 14 enveloping the wooden core 12, the shaped body portion formed of injection molded high impact polystyrene having a foaming agent injection molded around the wooden core, a neck 30 attached to the wooden inner core 12 at a forward end of the stringed musical instrument body, musical pickups 31 attached to a top of the stringed musical instrument body, and strings 34 attached between the neck and the musical pickups. The wooden core imparts a wood quality tone to the stringed instrument and the shaped body portion 14 imparts excellent sustain and resonance (28 seconds) to the stringed musical instrument.

The wooden inner core 12, a hard wood preferably mahogany, extends from a front end to a point immediately adjacent to a back end of the stringed musical instrument body and the neck 30 attaches to the wooden inner core at the front end of the stringed musical instrument body.

The wooden inner core 12 extends from a point immediately adjacent to a bottom of the stringed musical instrument body to a point immediately adjacent to a top of the stringed musical instrument body and the musical pickups 31 are attached to the wooden inner core.

The stringed musical instrument body 10 further comprises an outer covering surface which may comprise paint, a wood veneer, fiberglass, plastic binding added to the top edge of the body for cosmetic appearance, or any other desired finish.

The inner wooden core 12 has routed opening therein for the musical pickups 31, control cavities, and a neck pocket to receive the neck.

The stringed musical instrument may comprise any stringed musical instrument including a guitar, a base guitar, an electric guitar, an acoustic guitar, a violin, a fiddle, a viol, a viola, a base fiddle, a cello, a ukulele, a bouzouki, a balalaika, a lute, a mandolin, a zither, a sitar, a koto or other stringed musical instrument.

The method for making the stringed musical instrument 20 comprises as follows:

A first step comprises securing the wooden inner core 12 inside a two-piece injection mold 40A and 40B for a stringed musical instrument having a pair of spaced cylindrical holes 9 comprising a means for receiving two pins 41 comprising a holding device from a two-part injection mold 40A and 40B, as shown in FIG. 2.

A second step comprises injection molding polystyrene having a foaming agent in the mold around the wooden inner core 12 to form a stringed musical instrument body comprising a shaped body portion 14 of polystyrene having a foaming agent molded around the wooden inner core, the wooden inner core imparting a wood quality tone to the stringed instrument, the shaped body portion imparting sustain and resonance to the stringed musical instrument.

Figure 3:
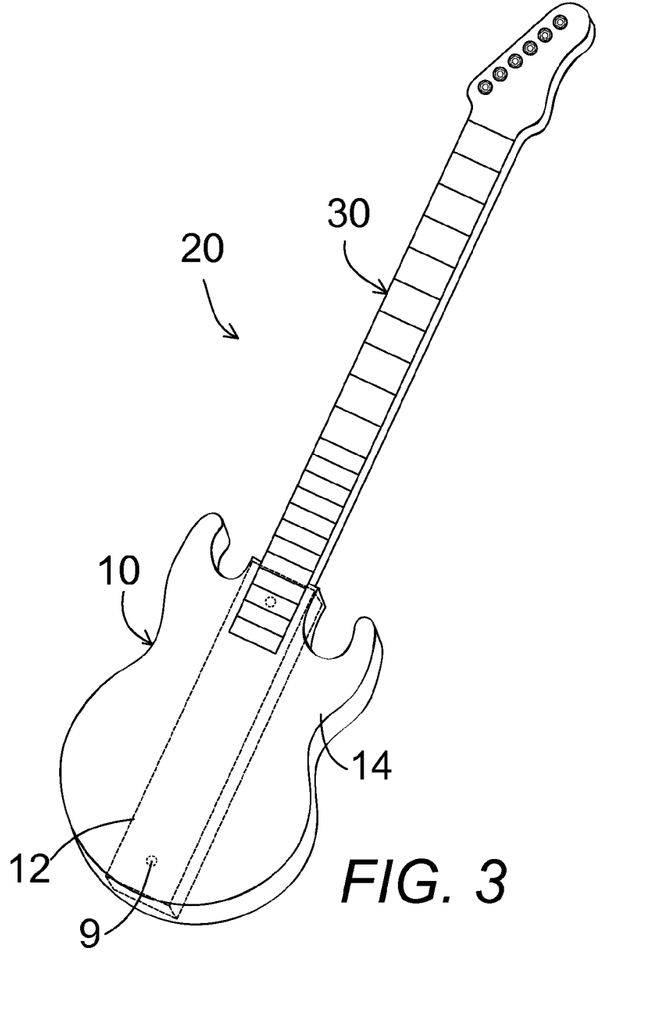
FIG. 3 is a perspective view of the stringed musical instrument (guitar) of FIG. 1 showing the neck attached to the body.

A third step comprises attaching a neck 30 to the wooden inner core 12 at a forward end of the stringed musical instrument body, the wooden inner core extending from a front end to a point immediately adjacent to a back end of the stringed musical instrument body 10.

A fourth step comprises attaching musical pickups 31 to a top of the stringed musical instrument body 10 in the wooden inner core 12, which extends from a point immediately adjacent to a bottom of the stringed musical instrument body to a point immediately adjacent to a top of the stringed musical instrument body.

Figure 4:
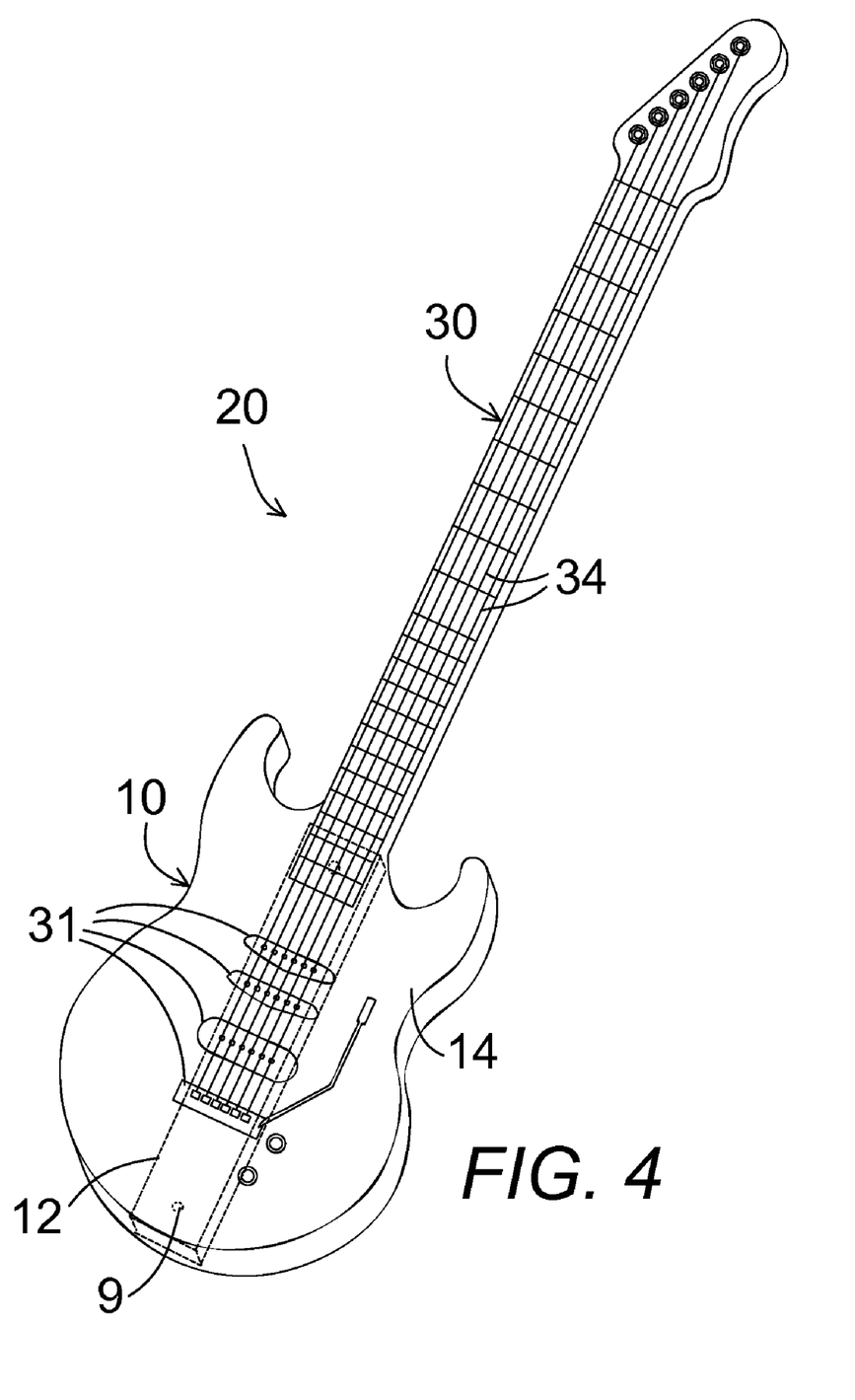
FIG. 4 is a perspective view of the stringed musical instrument (guitar) of FIG. 3 fully assembled.

A fifth step comprises attaching strings 34 between the neck 30 and the musical pickups 31.

A further step comprises covering the stringed musical instrument body with an outer covering surface with at least one covering taken from the list of coverings comprising paint, a wood veneer, fiberglass, plastic binding added to the top edge of the body for cosmetic appearance, or other desired finish.

Another step comprises routing openings in the inner wooden core for the musical pickups, control cavities, and a neck pocket to receive the neck.

Figure 5:
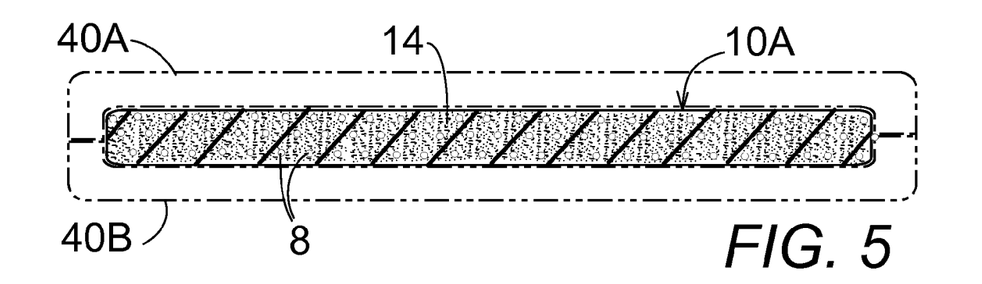
FIG. 5 is a cross-sectional view taken transversely through the stringed musical instrument (guitar) body showing the stringed musical instrument body in the injection mold with no wooden inner core.
Figure 6:
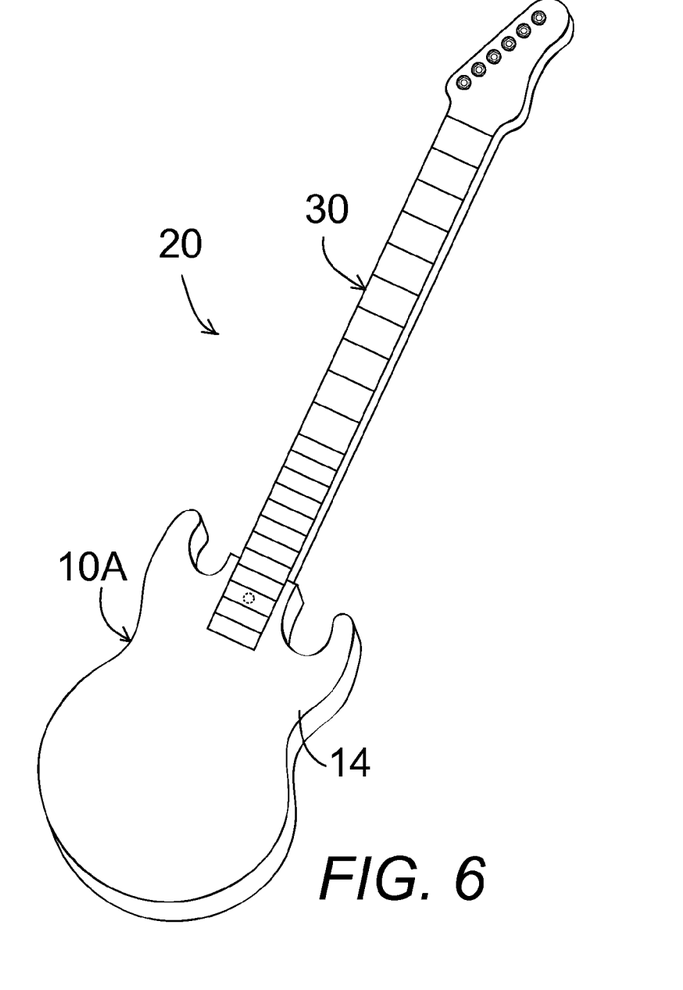
FIG. 6 is a perspective view of the stringed musical instrument (guitar) of FIG. 5 showing the neck attached to the body.

In FIGS. 5 and 6, an alternate embodiment of the stringed musical instrument 20 of the present invention comprises a stringed musical instrument body 10A comprising a shaped body portion 14 formed of injection molded high impact polystyrene having a foaming agent injection molded in the shape of the body portion, the high impact polystyrene imparting strength and resilient durability to the body portion and the multiplicity of air spaces 8 interspersed within the high impact polystyrene, due to the foaming agent, providing sustain and resonance to the stringed musical instrument. As in the other embodiment, a neck 30 is attached to a forward end of the stringed musical instrument body 10A, musical pickups 31 attached to a top of the stringed musical instrument body 10A, and strings 34 attached between the neck and the musical pickups, as in FIG. 4. The musical instrument body 10A further comprises at least one outer covering on an exterior surface of the stringed musical instrument body 10A taken from the list of coverings comprising paint, a wood veneer, fiberglass, plastic binding added to the top edge of the body for cosmetic appearance, or other covering material.

An alternate method for making the stringed musical instrument 20 comprises the following steps:

A first step of injection molding a high impact polystyrene having a foaming agent injection to form a stringed musical instrument body 10A, the high impact polystyrene imparting strength and resilient durability to the body portion and the multiplicity of air spaces 8 interspersed within the high impact polystyrene due to the foaming agent providing sustain and resonance to the stringed musical instrument.

A second step comprises attaching a neck 30 to a forward end of the stringed musical instrument body 10A.

A third step comprises attaching musical pickups 31 to a top of the stringed musical instrument body 10A.

A fourth step comprises attaching strings 34 between the neck 30 and the musical pickups 31.

A fifth step comprises covering the stringed musical instrument body with at least one outer covering surface taken from the list of coverings comprising paint, a wood veneer, fiberglass, plastic binding added to the top edge of the body for cosmetic appearance.

The method for making a stringed musical instrument of FIG. 5 further comprises a preliminary step of securing a wooden inner core 12 inside the injection mold for a stringed musical instrument so that the high impact polystyrene envelopes the wooden inner core during the molding process, as in FIG. 2.

To make the stringed instruments of the above embodiment of the present invention, high impact Polystyrene with a foaming agent is injection molded around a wooden insert held in place in the injection molding process by two pins from one side of the mold fitting into two holes in the wood insert, thereby forming the shape of the body of the stringed instrument. On the inside of one side of the mold will be the two pins sticking outward to hold the wooden insert, which is approximately 4" or 5" wide and the length of the body of the instrument. This piece of wood is permanently imbedded in the body. It's purpose is to add the wood tone to the synthetic body. The Polystyrene will give it the sustain and resonance.

Figure 7:
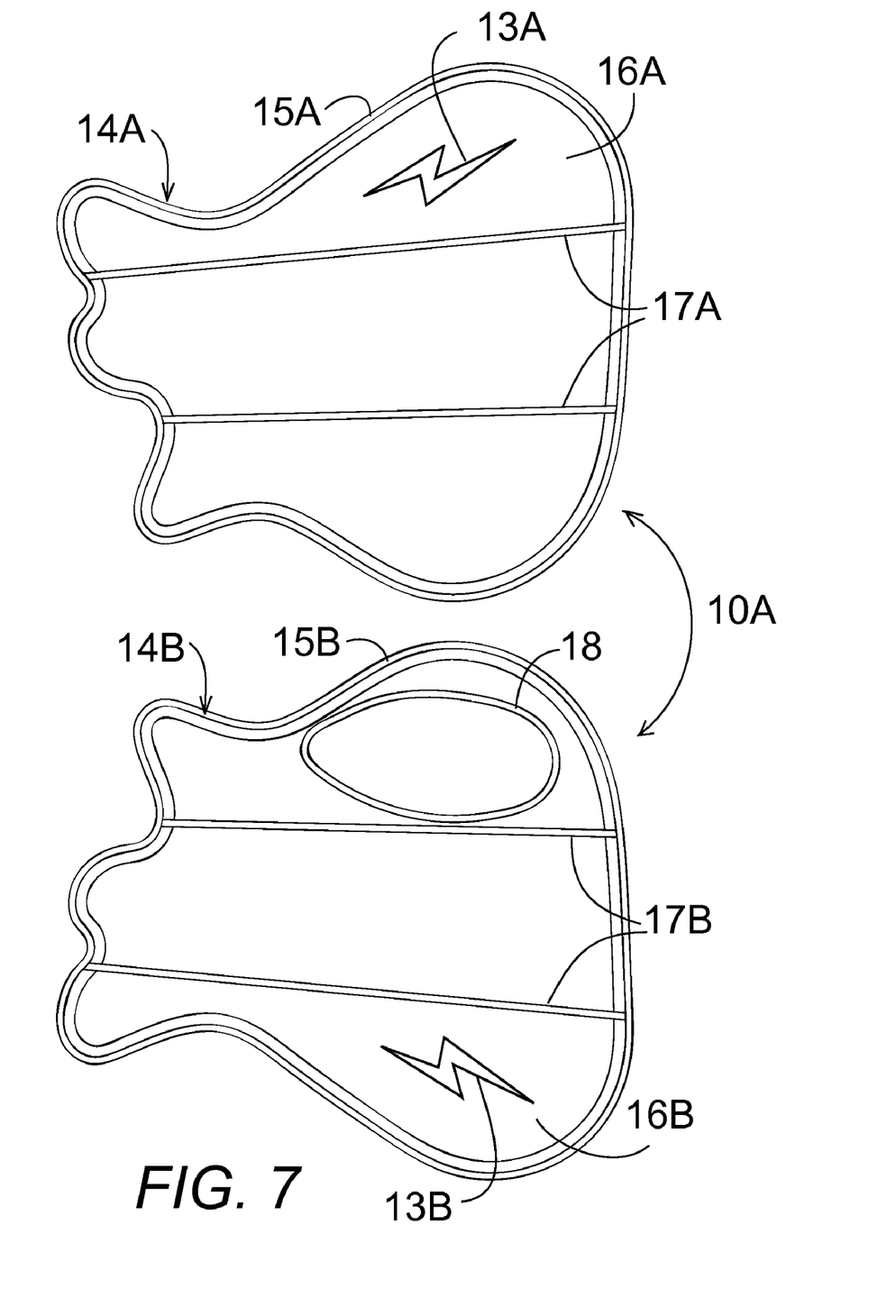
FIG. 7 is a plan view of a separately injection molded front panel and back panel of the stringed musical instrument (guitar) body of the present invention.
Figure 8:
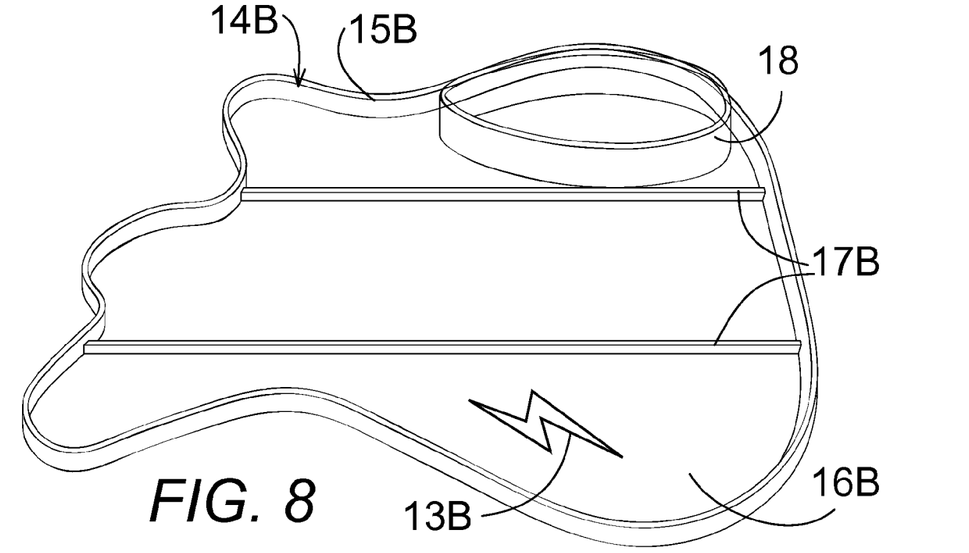
FIG. 8 is a perspective view of the injection molded back panel of FIG. 7.
Figure 9:
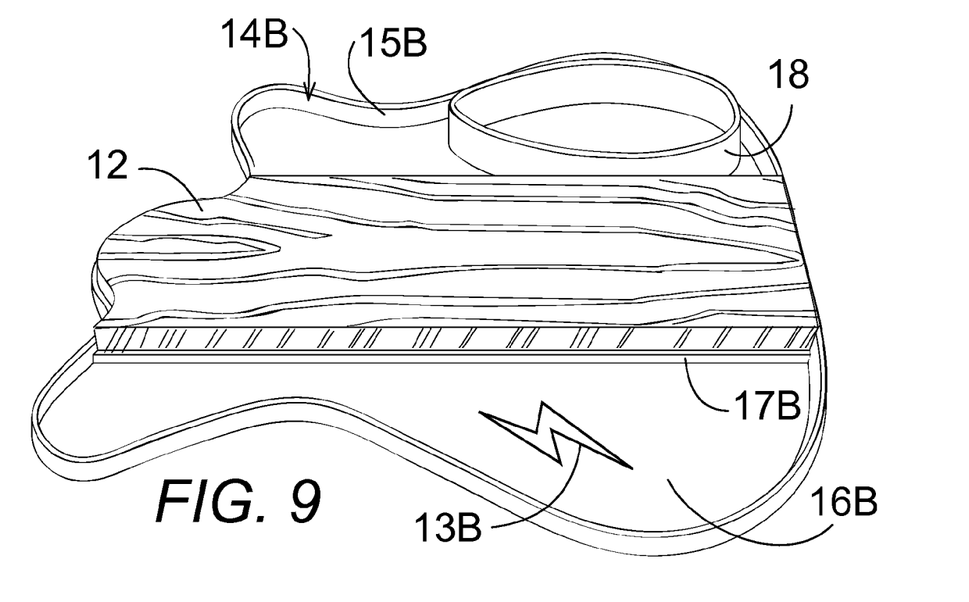
FIG. 9 is a perspective view of the injection molded back panel of FIG. 7 showing the inner wood core attached thereto.

In FIGS. 7-10, 11A, 11B, 12A, and 12B, the stringed musical instrument body 10A comprises a wooden inner core element 12 comprising a solid piece of dense fiber wood, preferably a hardwood such as mahogany, having routing openings in the inner wooden core for the musical pickups 31 (FIG. 4), control cavities, and a neck pocket to receive a neck 30A attached thereto, as shown in FIGS. 9, 12A and 12B. the wooden inner core imparts a wood quality tone to the stringed musical instrument 10A.

In FIGS. 7-9, the musical instrument body further comprises a shaped body portion 10A enveloping the wooden core 12, the shaped body portion comprising a shaped front panel 14A and a mating back panel 14B with a shaped outer perimeter wall 15A and 15B therebetween spaced apart from the wooden inner core 12. The shaped front panel 14A and mating shaped back panel 14B sandwiching the wooden core 12 therebetween with the outer perimeter wall 15A and 15B enclosing the edges of the musical instrument body. The panels are formed of injection molded synthetic material combined with a foaming agent to create a series of air bubbles extending throughout the shaped body portion forming a continuous network of miniature sound chambers throughout the synthetic material, the shaped body portion imparting sustain and resonance to the stringed musical instrument.

Figure 10:
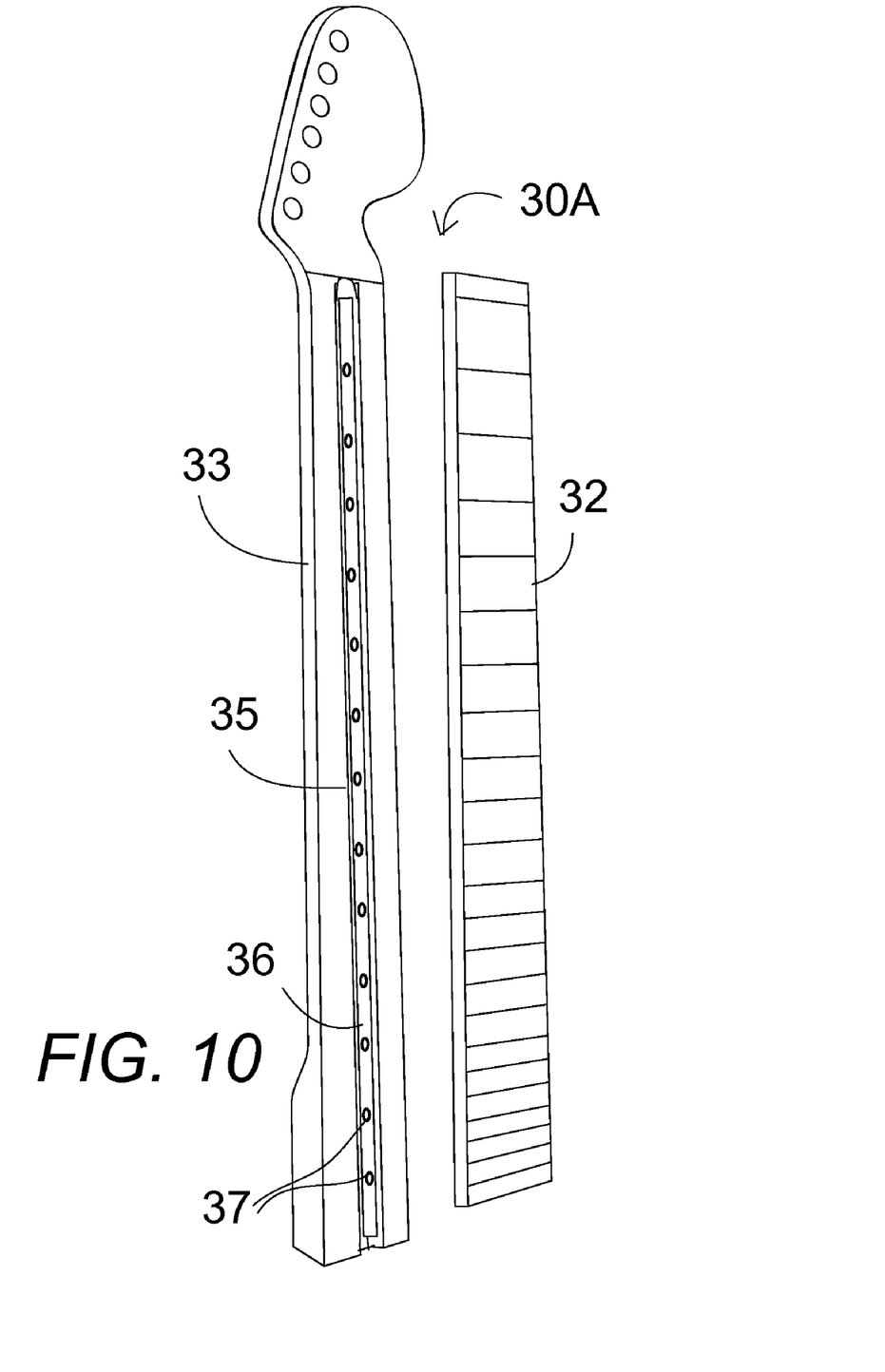
FIG. 10 is an exploded perspective view of the injection molded neck of the present invention with the finger board aligned for attachment thereto.

In FIGS. 10, 12A and 12B, a neck 30A having a fingerboard 32 is attached to a forward end of the stringed musical instrument body 10A. In FIG. 10, the neck 30A comprises an elongated rigid member 33 fabricated of injection molded synthetic material having a center groove 35 in a top surface of the neck along the length of the neck. An elongated strip of metal 36 fits within the center groove to prevent warping of the neck. An elongated wooden finger board 32 is adhered to the front of the neck and a portion of the front panel 14A of the shaped body portion for fingering the strings.

Musical pickups 31 are attached to a top of the stringed musical instrument body as in the embodiment of FIG. 4. Strings 34 are attached between the neck 30A and the musical pickups 31.

In FIGS. 7, 9, 11A, 11B, 12A, and 12B, the shaped front panel 14A and the mating back panel 14B are each separately injection molded of high impact polystyrene, each having a half of the shaped outer perimeter wall 15A and 15B extending outwardly therebetween. The two panels are adhered to the inner wooden core 12 and the two halves of the shaped outer perimeter wall 15A an 15B adhered together to form an airtight seal therebetween to form the outer shaped body portion 10A. The front panel 14A and back panel 14B each contact the wooden inner core 12 on a center portion along the length of the outer shaped body portion leaving an inner air space 19A between the outer perimeter wall and the inner wooden core forming a sound chamber. The outer shaped body portion has at least one sound hole 13A and 13B in the outer shaped body portion communicating with the sound chamber 19A to transmit the sound from the sound chamber.

Figure 11A:
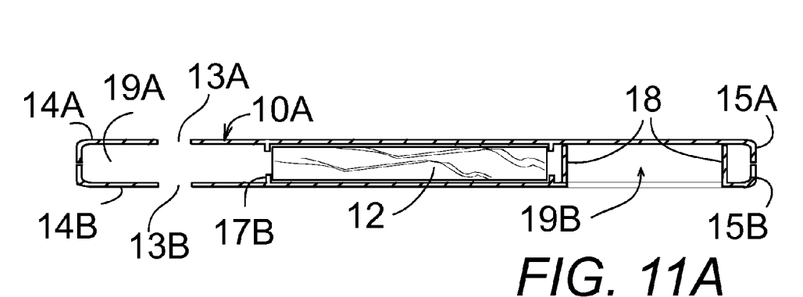
FIG. 11A is a transverse cross-sectional view taken through 11-11 of FIG. 12A showing the injection molded front panel and back panel of FIG. 7 adhered together sandwiching the inner wood core therebetween with air sound chambers between the inner wood core and the sides.
Figure 11B:
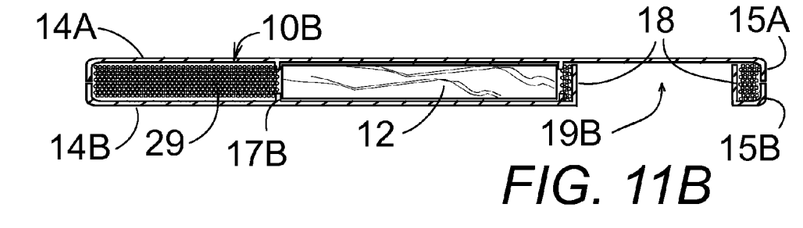
FIG. 11B is a transverse cross-sectional view similar to that of FIG. 11A showing the injection molded front panel and back panel of FIG. 7 adhered together sandwiching the inner wood core therebetween with an injected synthetic material in combination with a foaming agent in the sound chambers to create a continuous network of miniature sound chambers throughout the synthetic material.
Figure 12:
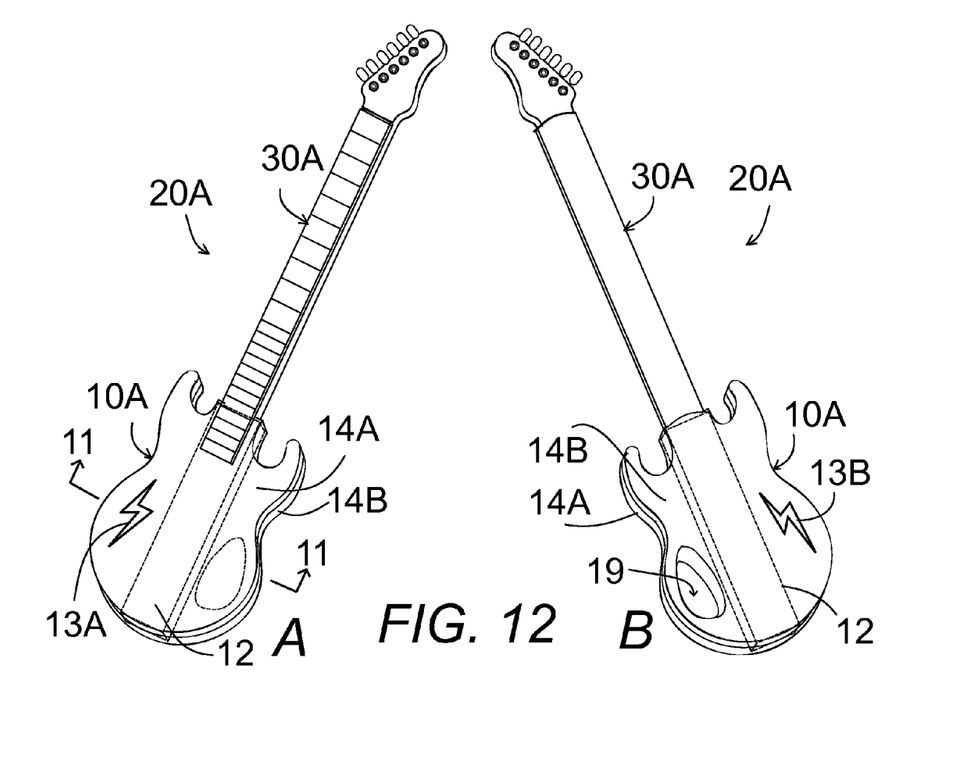
FIG. 12A is a perspective view of the stringed musical instrument (guitar) formed by adhered together the injection molded front panel and back panel of FIG. 7 sandwiching the inner wood core of FIG. 9 therebetween to form the body with the injection molded neck and fingerboard of FIG. 10 attached to the body showing the front side of the instrument.
FIG. 12B is a perspective view of the stringed musical instrument (guitar) of FIG. 12A showing the back side of the instrument.

In FIG. 11B, the sound chamber is filled at least in part with an injected synthetic material in combination with a foaming agent 29 to create a continuous network of miniature sound chambers throughout the synthetic material.

In FIGS. 11A, 11B, and 12B, a hollow outer air space 19B preferably in the bottom panel 14B of the outer shaped body is formed by a protrusion of the mold creating a body opening, the outer air space 19B through an outer face of one of the panels to an inner face of the other of the panels with a continuous wall 18 surrounding the opening and extending perpendicularly from the one of the panels and adhered to the other of the panels for receiving equipment positioned therein used in the sound production emanating from the musical instrument.

A method for making a stringed musical instrument 20A of FIGS. 7-10, 11A, 11B, 12A, and 12B comprising:

a first step of injection molding a shaped body portion comprising a shaped front panel 14A and a mating back panel 14B with a shaped outer perimeter wall 15A and 15B therebetween spaced apart from the wooden inner core 12, the shaped front panel and the mating back panel each separately injection molded of high impact injection molded synthetic material combined with a foaming agent to create a series of air bubbles extending throughout the shaped body portion forming a continuous network of miniature sound chambers throughout the synthetic material, the shaped body portion imparting sustain and resonance to the stringed musical instrument, each of the panels having a half of the shaped outer perimeter wall extending outwardly therebetween;

a second step of adhering the two panels together sandwiching an inner wooden core therebetween, as shown in FIGS. 11A and 11B, the panels 14A and 14B adhered to the inner wooden core 12 and the two halves of the shaped outer perimeter wall 15A and 15B adhered together to form an airtight seal therebetween to form the outer shaped body portion 10A, so that the front panel 14A and back panel 14B each contact the wooden inner core 12 on a center portion along the length of the outer shaped body portion leaving an inner air space 19A between the outer perimeter wall and the inner wooden core forming a sound chamber, the outer perimeter wall 15A and 15B enclosing the edges of the musical instrument body, the outer shaped body portion having at least one sound hole 13A in the outer shaped body portion communicating with the sound chamber, the inner wooden core comprising a solid piece of dense fiber wood imparting a wood quality tone to the stringed musical instrument;

a third step of covering the stringed musical instrument body with at least one outer covering surface taken from the list of coverings comprising paint, a wood veneer, fiberglass, plastic binding added to the top edge of the body for cosmetic appearance.

a fourth step of attaching a neck 30A to the inner wooden core at a forward end of the stringed musical instrument body;

a fifth step of attaching musical pickups 31, as shown in FIG. 4, to a top of the stringed musical instrument body;

a sixth step of attaching strings 34 between the neck and the musical pickups.

In FIG. 11B, the method may comprising filling the sound chamber at least in part with an injected synthetic material in combination with a foaming agent 29 to create a continuous network of miniature sound chambers throughout the synthetic material.

Step one preferably further comprises forming a hollow outer air space 19B in the outer shaped body during the injection molding process by a protrusion of the mold creating a body opening through an outer face of one of the panels 14B to an inner face of the other of the panels 14A with a continuous wall 18 surrounding the opening and extending perpendicularly from the one of the panels and adhered to the other of the panels for receiving equipment positioned therein used in the sound production emanating from the musical instrument.

In FIG. 10, the fourth step comprises preliminary steps of fabricating the neck 30A by injection molding synthetic material to form an elongated rigid member 33 having a center groove 35 in a top surface of the neck along the length of the neck; securing an elongated strip of metal 36 which may have a series of openings 37 fitting within the center groove to prevent warping of the neck; and adhering an elongated wooden finger board 32 to the front of the neck and a portion of the front panel of the shaped body portion for fingering the strings.

The method of the present invention will increase production rate and reduce labor cost considerably and will be able to produce a body every 3-4 minutes. The body can then be routed for pickups, control cavities, neck pocket etc. After molding the blank bodies, they are each painted and have a conventional wooden neck attached to the body. The complete stringed instrument is light in weight, so that the guitar weighs under 5 pounds. The stringed instruments of the present invention have a great tone due to the wood and superior sustain and resonance produced by the polystyrene with the foaming agent. A thin wood veneer top can be glued to the top of the body to enhance it's looks and make it look like a real wood stringed instrument. Plastic binding can be added to the top edge of the body for cosmetic appearance as well.

It is understood that the preceding description is given merely by way of illustration and not in limitation of the invention and that various modifications may be made thereto without departing from the spirit of the invention as claimed.

What is claimed is:

1. A stringed musical instrument comprising:

a stringed musical instrument body comprising a wooden inner core element comprising a solid piece of dense fiber wood having routing openings in the inner wooden core for the musical pickups, control cavities, and a neck pocket to receive a neck attached thereto, the wooden inner core imparting a wood quality tone to the stringed musical instrument; and a shaped body portion enveloping the wooden core, the shaped body portion comprising a shaped front panel and a mating back panel with a shaped outer perimeter wall therebetween spaced apart from the wooden inner core, the shaped front panel and mating shaped back panel sandwiching the wooden core therebetween with the outer perimeter wall enclosing the edges of the musical instrument body, the shaped body portion formed of injection molded synthetic material combined with a foaming agent to create a series of air bubbles extending throughout the shaped body portion forming a continuous network of miniature sound chambers throughout the synthetic material, the shaped body portion imparting sustain and resonance to the stringed musical instrument;

a neck having a fingerboard attached to a forward end of the stringed musical instrument body;

musical pickups attached to a top of the stringed musical instrument body;

strings attached between the neck and the musical pickups.

2. The stringed musical instrument of claim 1 wherein the wooden inner core further comprises means for receiving at least one holding device from an injection mold to secure the wooden inner core within an injection mold cavity during an injection molding process and the shaped body portion is formed of injection molded high impact polystyrene having a foaming agent injection molded around the wooden core, the high impact polystyrene imparting strength and resilient durability to the body portion and the multiplicity of air spaces interspersed within the high impact polystyrene due to the foaming agent providing sustain and resonance to the stringed musical instrument.

3. The stringed musical instrument of claim 1 wherein the stringed musical instrument body further comprises at least one outer covering surface taken from the list of coverings comprising paint, a wood veneer, fiberglass, plastic binding added to the top edge of the body for cosmetic appearance.

4. The stringed musical instrument of claim 1 wherein the inner wooden core is a hard wood.

5. The stringed musical instrument of claim 4 wherein the inner wooden core is mahogany.

6. The stringed musical instrument of claim 1 wherein the stringed musical instrument comprises a stringed musical instrument taken from the list of stringed musical instruments comprising a guitar, a base guitar, an electric guitar, an acoustic guitar, a violin, a fiddle, a viol, a viola, a base fiddle, a cello, a ukulele, a bouzouki, a balalaika, a lute, a mandolin, a zither, a sitar, a koto.

7. The stringed musical instrument of claim 1 wherein the shaped front panel and the mating back panel are each separately injection molded of high impact polystyrene, each having a half of the shaped outer perimeter wall extending outwardly therebetween, the two panels adhered to the inner wooden core and the two halves of the shaped outer perimeter wall adhered together to form an airtight seal therebetween to form the outer shaped body portion, so that the front and back panels each contact the wooden inner core on a center portion along the length of the outer shaped body portion leaving an inner air space between the outer perimeter wall and the inner wooden core forming a sound chamber, the outer shaped body portion having at least one sound hole in the outer shaped body portion communicating with the sound chamber.

8. The stringed musical instrument of claim 7 wherein the sound chamber is filled at least in part with an injected synthetic material in combination with a foaming agent to create a continuous network of miniature sound chambers throughout the synthetic material.

9. The stringed musical instrument of claim 7 further comprising a hollow outer air space in the outer shaped body formed by a protrusion of the mold creating a body opening through an outer face of one of the panels to an inner face of the other of the panels with a continuous wall surrounding the opening and extending perpendicularly from the one of the panels and adhered to the other of the panels for receiving equipment positioned therein used in the sound production emanating from the musical instrument.

10. The stringed musical instrument of claim 1 wherein the neck comprises an elongated rigid member fabricated of injection molded synthetic material having a center groove in a top surface of the neck along the length of the neck; an elongated strip of metal fitting within the center groove to prevent warping of the neck; and an elongated wooden finger board adhered to the front of the neck and a portion of the front panel of the shaped body portion for fingering the strings.

11. A method for making a stringed musical instrument comprising:

a first step of securing a wooden inner core inside an injection mold for a stringed musical instrument, the inner wooden core having a means for receiving at least one holding device from the injection mold to secure the wooden inner core within an injection mold cavity in the mold during an injection molding process;

a second step of injection molding polystyrene having a foaming agent in the mold around the wooden inner core to form a stringed musical instrument body comprising a shaped body portion of polystyrene having a foaming agent molded around the wooden inner core, the wooden inner core imparting a wood quality tone to the stringed instrument, the shaped body portion imparting sustain and resonance to the stringed musical instrument;

a third step of attaching a neck to a forward end of the stringed musical instrument body, wherein the wooden inner core extends from a front end to a point immediately adjacent to a back end of the stringed musical instrument body and the neck attaches to the wooden inner core at the front end of the stringed musical instrument body;

a fourth step of attaching musical pickups to a top of the stringed musical instrument body, wherein the wooden inner core extends from a point immediately adjacent to a bottom of the stringed musical instrument body to a point immediately adjacent to a top of the stringed musical instrument body and the musical pickups are attached to the wooden inner core;

a fifth step of attaching strings between the neck and the musical pickups.

12. The method of claim 11 further comprising a step of covering the stringed musical instrument body with at least one outer covering surface taken from the list of coverings comprising paint, a wood veneer, fiberglass, plastic binding added to the top edge of the body for cosmetic appearance.

13. The method of claim 11 further comprises another step of routing openings in the inner wooden core for the musical pickups, control cavities, and a neck pocket to receive the neck.

14. The method of claim 10 wherein the method comprises forming a stringed musical instrument taken from the list of stringed musical instruments comprising a guitar, a base guitar, an electric guitar, an acoustic guitar, a violin, a fiddle, a viol, a viola, a base fiddle, a cello, a ukulele, a bouzouki, a balalaika, a lute, a mandolin, a zither, a sitar, a koto.

15. A method for making a stringed musical instrument, the method comprising:

a first step of injection molding a shaped body portion comprising a shaped front panel and a mating back panel with a shaped outer perimeter wall therebetween spaced apart from the wooden inner core, the shaped front panel and the mating back panel each separately injection molded of high impact injection molded synthetic material combined with a foaming agent to create a series of air bubbles extending throughout the shaped body portion forming a continuous network of miniature sound chambers throughout the synthetic material, the shaped body portion imparting sustain and resonance to the stringed musical instrument, each of the panels having a half of the shaped outer perimeter wall extending outwardly therebetween;

a second step of adhering the two panels together sandwiching an inner wooden core therebetween, the panels adhered to the inner wooden core and the two halves of the shaped outer perimeter wall adhered together to form an airtight seal therebetween to form the outer shaped body portion, so that the front and back panels each contact the wooden inner core on a center portion along the length of the outer shaped body portion leaving an inner air space between the outer perimeter wall and the inner wooden core forming a sound chamber, the outer perimeter wall enclosing the edges of the musical instrument body, the outer shaped body portion having at least one sound hole in the outer shaped body portion communicating with the sound chamber, the inner wooden core comprising a solid piece of dense fiber wood imparting a wood quality tone to the stringed musical instrument;

a third step of covering the stringed musical instrument body with at least one outer covering surface taken from the list of coverings comprising paint, a wood veneer, fiberglass, plastic binding added to the top edge of the body for cosmetic appearance.

a fourth step of attaching a neck to the inner wooden core at a forward end of the stringed musical instrument body;

a fifth step of attaching musical pickups to a top of the stringed musical instrument body;

a sixth step of attaching strings between the neck and the musical pickups.

16. The method of claim 15 further comprising filling the sound chamber at least in part with an injected synthetic material in combination with a foaming agent to create a continuous network of miniature sound chambers throughout the synthetic material.

17. The method of claim 15 wherein step one further comprises forming a hollow outer air space in the outer shaped body during the injection molding process by a protrusion of the mold creating a body opening through an outer face of one of the panels to an inner face of the other of the panels with a continuous wall surrounding the opening and extending perpendicularly from the one of the panels and adhered to the other of the panels for receiving equipment positioned therein used in the sound production emanating from the musical instrument.

18. The method of claim 15 wherein the fourth step comprises preliminary steps of fabricating the neck by injection molding synthetic material to form an elongated rigid member having a center groove in a top surface of the neck along the length of the neck; securing an elongated strip of metal fitting within the center groove to prevent warping of the neck; and adhering an elongated wooden finger board to the front of the neck and a portion of the front panel of the shaped body portion for fingering the strings.

19. A stringed musical instrument comprising:

a stringed musical instrument body comprising a shaped body portion formed of injection molded high impact polystyrene having a foaming agent injection molded in the shape of the body portion, the high impact polystyrene imparting strength and resilient durability to the body portion and the multiplicity of air spaces interspersed within the high impact polystyrene due to the foaming agent creating a series of air bubbles extending throughout the shaped body portion forming a continuous network of miniature sound chambers throughout the synthetic material, the shaped body portion imparting sustain and resonance to the stringed musical instrument;

a neck attached to a forward end of the stringed musical instrument body;

musical pickups attached to a top of the stringed musical instrument body;

strings attached between the neck and the musical pickups.

20. The stringed musical instrument of claim 19 further comprising a wooden inner core enveloped by the high impact polystyrene during injection molding, the wooden inner core imparting a wood quality tone to the stringed musical instrument.

21. A method for making a stringed musical instrument comprising:

a first step of injection molding a high impact polystyrene having a foaming agent injection to form a stringed musical instrument body comprising, the high impact polystyrene imparting strength and resilient durability to the body portion and the multiplicity of air spaces interspersed within the high impact polystyrene due to the foaming agent creating a series of air bubbles extending throughout the shaped body portion forming a continuous network of miniature sound chambers throughout the synthetic material, the shaped body portion imparting sustain and resonance to the stringed musical instrument;

a second step of attaching a neck to a forward end of the stringed musical instrument body;

a third step of attaching musical pickups to a top of the stringed musical instrument body;

a fourth step of attaching strings between the neck and the musical pickups;

a fifth step of covering the stringed musical instrument body with at least one outer covering surface taken from the list of coverings comprising paint, a wood veneer, fiberglass, plastic binding added to the top edge of the body for cosmetic appearance.

22. The method for making a stringed musical instrument of claim 21 further comprising a preliminary step of securing a wooden inner core inside an injection mold for a stringed musical instrument so that the high impact polystyrene envelopes the wooden inner core during the molding process, the wooden inner core imparting a wood quality tone to the stringed musical instrument.

* * * * *